US005530233A

United States Patent [19]
Krichever et al.

[11] Patent Number: 5,530,233
[45] Date of Patent: Jun. 25, 1996

[54] BAR CODE SCANNER WITH QUASI-RETROREFLECTIVE LIGHT COLLECTION

[75] Inventors: Mark Krichever, Hauppauge; Simon Bard, Stony Brook; Peter Fazekas, Medford, all of N.Y.

[73] Assignee: Symbol Technologies, Inc., Bonemia, N.Y.

[21] Appl. No.: 268,360

[22] Filed: Jun. 30, 1994

[51] Int. Cl.[6] ................................................. G06K 7/10
[52] U.S. Cl. .......................... 235/440; 235/454; 235/462
[58] Field of Search .................................... 235/462, 435, 235/439, 440, 454, 467

[56] References Cited

U.S. PATENT DOCUMENTS

| | | |
|---|---|---|
| 3,643,066 | 2/1972 | Coliz et al. . |
| 4,196,845 | 4/1980 | Chesters . |
| 4,230,265 | 10/1980 | Casaly . |
| 4,251,798 | 2/1981 | Swartz et al. ................ 340/146.3 |
| 4,369,361 | 1/1983 | Swartz et al. ................ 235/470 |
| 4,387,297 | 6/1983 | Swartz et al. ................ 235/462 |
| 4,387,397 | 6/1983 | Dietz ................ 358/154 |
| 4,409,470 | 10/1983 | Shepard et al. ................ 235/472 |
| 4,418,276 | 11/1983 | Yatsunami ................ 235/462 |
| 4,760,248 | 7/1988 | Swartz et al. ................ 235/472 |
| 4,794,239 | 12/1988 | Allais ................ 235/462 |
| 4,816,661 | 3/1989 | Krichever et al. ................ 235/472 |
| 4,818,886 | 4/1989 | Drucker ................ 235/462 X |
| 4,874,936 | 10/1989 | Chandler et al. ................ 235/494 |
| 4,896,026 | 1/1990 | Krichever et al. ................ 235/472 |
| 4,896,029 | 1/1990 | Chandler et al. . |
| 4,916,297 | 4/1990 | Tukada et al. . |
| 4,963,756 | 10/1990 | Quan et al. ................ 235/462 X |
| 4,998,010 | 3/1991 | Chandler et al. . |
| 5,010,241 | 4/1991 | Butterworth ................ 235/462 |
| 5,019,699 | 5/1991 | Koenck ................ 235/462 X |
| 5,059,779 | 10/1991 | Krichever et al. . |
| 5,073,700 | 12/1991 | D'Onofrio . |
| 5,086,215 | 2/1992 | Carsner et al. . |
| 5,160,836 | 11/1992 | Miyake . |
| 5,192,856 | 3/1993 | Schaham . |
| 5,196,686 | 3/1993 | Leister . |
| 5,210,398 | 5/1993 | Metlitsky . |
| 5,214,274 | 5/1993 | Yang . |
| 5,272,323 | 12/1993 | Martino . |
| 5,272,353 | 12/1993 | Barkan et al. . |
| 5,276,315 | 1/1994 | Surka . |
| 5,278,397 | 1/1994 | Barkan et al. . |
| 5,304,786 | 4/1994 | Pavlidis et al. . |
| 5,308,966 | 5/1994 | Danielson et al. . |

FOREIGN PATENT DOCUMENTS

| | | |
|---|---|---|
| 0385478A2 | 3/1990 | European Pat. Off. . |
| 0460669A2 | 6/1991 | European Pat. Off. . |
| 0569962A2 | 11/1993 | European Pat. Off. . |
| 55-115164 | 9/1980 | Japan ................ 235/462 |
| 60-238977A | 11/1985 | Japan . |
| 1-93871 | 4/1989 | Japan . |
| 3-198175 | 8/1991 | Japan . |
| 3-266089A | 11/1991 | Japan ................ 235/462 |

OTHER PUBLICATIONS

Forest, "Optical Detectors: Three Contenders," IEEE Spectrum, pp. 76–84, 1986.
Borsuk, "Photodetectors for Acousto–Optic Signal Processors," Proceedings of the IEEE, 69:, pp. 100–118, 1981.

*Primary Examiner*—Donald T. Hajec
*Assistant Examiner*—Jeffrey R. Filipek
*Attorney, Agent, or Firm*—Fish & Richardson

[57] ABSTRACT

Optical scanning of bar code symbols in which light reflected from the scanned symbol is collected with stationary light collection optics and swept across an array of individual light detection elements (e.g., photodetectors). Detection circuitry determines which of the detection elements is receiving the incoming light beam at a given time, and produces an output signal based preferably only on the outputs of those detection elements. The selection of detection elements to be used in forming the output signal may be made by synchronizing the sampling of the detection elements with the scanning movement of the outgoing light beam. Alternatively, the selection may be based on the output level of the detection elements (e.g., by only using outputs that exceed a predetermined threshold).

16 Claims, 3 Drawing Sheets

BAR CODE SCANNER WITH QUASI-RETROREFLECTIVE LIGHT COLLECTION

BACKGROUND

This invention relates to bar code scanning.

In bar code scanning systems, a light beam is scanned across a bar code symbol, and reflected light is collected, using either retroreflective or non-retroreflective light collection.

In retroreflective light collection, a single optical component, e.g., a rotating mirror, as described in Krichever et al. U.S. Pat. No. 4,816,661 or Shepard et al. U.S. Pat. No. 4,409,470, both herein incorporated by reference, scans the beam across a target surface and directs the collected light to a detector. The rotating mirror must be relatively large to receive the incoming light, but only a small detector is required because the rotating mirror can focus the light on to a small area. As a result, the detector has a relatively small field of view, which increases signal-to-noise ratio.

In non-retroreflective light collection, the reflected laser light is not collected by the same rotating mirror used for scanning. Instead, the detector is constructed to have a large field of view so that the reflected laser light traces across the surface of the detector. Because the rotating mirror need only handle the outgoing light beam, it can be made much smaller. But the detector must be relatively large in order to receive the incoming light beam from all scanned locations.

It has become increasingly desirable not only to increase the scanning rate of bar code scanners (e.g., to increase the throughput of scanned items), but also to increase the signal-to-noise ratio of bar code scanners to accommodate the increasing information density stored in bar code labels.

In recent years, there have been increasing demands for storing more information in a bar code label. In particular, there is a desire to create a "portable data file", as opposed to the "license plate" nature of conventional bar code symbols. For example, a typical UPC bar code only contains the manufacturer's code and the item number. The price look-up must be accessed in a database keyed to the item number in the bar code. Alternatively, a two-dimensional bar code could be used to store all of the relevant information, such as price, the name of the product, manufacturer, weight, inventory data, and expiration date. This would constitute a "portable data file" because the information could be retrieved without access to a database. While a price look-up database file is conveniently available in a retail environment, this may not be the case in other applications.

Although two-dimensional bar code schemes do not have vertical redundancy, they incorporate other forms of redundancy as well as other advantages, while increasing the density of information storage. For example, Code PDF417 allows stitching of partial scans, error detection, and error correction.

SUMMARY OF THE INVENTION

In general the invention features optical scanning in which light reflected from the scanned symbol is collected with stationary light collection optics and swept across an array of individual light detection elements (e.g., photodetectors). Detection circuitry determines which of the detection elements is receiving the incoming light beam at a given time, and produces an output signal based preferably only on the outputs of those detection elements. The selection of detection elements to be used in forming the output signal may be made by synchronizing the sampling of the detection elements with the scanning movement of the outgoing light beam. Alternatively, the selection may be based on the output level of the detection elements (e.g., by only using outputs that exceed a predetermined threshold).

The invention resolves the seemingly conflicting requirements, encountered in conventional retroreflecting and non-retroreflecting scanning schemes, of a large working range and high scan speeds. It makes possible the simultaneous achievement of high scanning rates and high signal-to-noise ratios.

Because the detector is capable of selectively distinguishing the location of the incoming signal beam on the array of detection elements, each detection element can be configured to have a narrow field of view (i.e., only a portion of the scanned path is viewed at a time). The invention thus allows for the rejection of ambient light and other factors, and therefore an increase in the signal-to-noise ratio.

Because the light collecting optics are stationary, the moving optical element in the scanning optics can be made much smaller than would be the case in conventional retroreflective designs, thus greatly increasing the maximum scanning frequency. Conventional retroreflective scanners generally have scanning rates of only about 18 Hz. Whereas, light collection according to the invention allows for scanning rates on the order about 100 Hz, and potentially up to about 500 Hz.

Also, by not relying on movable optical elements to direct the incoming signal beam onto the detector, the additional signal noise associated with such movable optics is eliminated.

Sensing each photodetector in a synchronous way timed with the incidence of the incoming signal beam, provides a further means to increase the signal-to-noise ratio by rejecting e.g., unwanted ambient light incident on the photodetector.

Preferably the array of detection elements comprises an array of individual photodetectors. Constructing the detector from an array of relatively small photodetectors, as opposed to one large photodetector, allows the scanner to operate at much higher rates because the capacitive, bandwidth limiting effects of the photodetectors decrease with decreasing photodetector size.

Different ones of the individually accessible photodetectors may be oriented to preferentially receive the incoming signal beam along first and second intersecting incoming signal beam paths.

The detector preferably includes a filter constructed to selectively transmit primarily only light having a wavelength range corresponding to the expected wavelength range of the incoming light beam. Fresnel lenses may be used on the photodetectors to further restrict field of view.

Other features and advantages of the invention will be apparent from the following description and from the claims.

DESCRIPTION OF PREFERRED EMBODIMENTS

Figure 1:
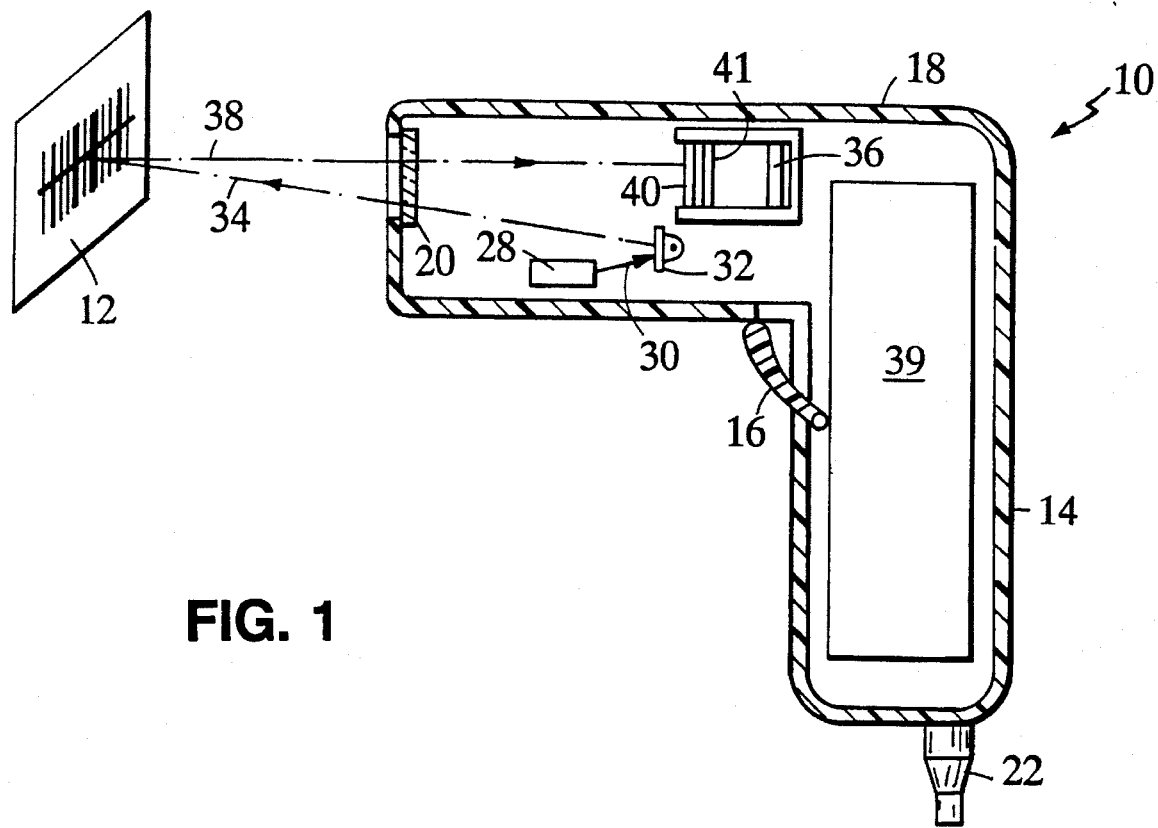
FIG. 1 is a sectional view of a hand-held bar code reader.

Referring to FIG. 1, a hand-held bar code reader 10 is positioned to read a bar code symbol 12. The reader is implemented as gun-shaped device with a pistol-grip handle 14. A manually actuated trigger switch 16 allows an operator to activate the reader (typically, once the reader has been positioned to point at the symbol to be scanned).

A lightweight plastic housing 18 contains the optical scanner components of the reader, including a laser source and detector. A light-transmissive window 20, at the front-end of the scanner, allows outgoing laser beams generated by the laser to exit the scanner, and allows incoming beams, reflected from bar code symbol 12, to enter the scanner.

An electrical cable 22 carries signals from the scanner 10 a decode module (not shown) that decodes the scanner signals into data representative of the scanned bar code symbol. An external host device (not shown), e.g., a programmable computer, serves as a data store in which data generated by decode module is stored for subsequent processing.

In use, each time a user wishes to scan a bar code symbol, the user aims the bar code reader at the symbol and pulls trigger 16 to initiate reading symbol 12. The symbol is scanned at a rapid rate, e.g., on the order of about one hundred times per second. As soon as the symbol has been successfully decoded and read, the scanning action is automatically terminated, thereby enabling the user to direct the scanner to another target to be read.

A laser source 28, e.g., a semiconductor laser diode emits a light beam 30 toward a moving optical element 32 (e.g., a rotating mirror), which in turn directs the outgoing light beam along an outgoing path 34 through window 20 that faces bar code symbol 12. A detector 36 detects an incoming light beam 38, which reflects off symbol 12 and enters the scanner. Electronic circuitry 39 controls the operation of the scanning optics and optical detector. An optical lens 40 and an optical filter 41 can be mounted inside the scanner to intercept the incoming light before the incoming light reaches detector 36. If a filter is employed, it is desirable that the filter only selectively transmit light having a wavelength range corresponding to the wavelength range of the scanned laser beam.

Rotating mirror 32 directs the outgoing light along a path which traces the beam across the surface of target 12. An electrically-operated drive moves mirror 32 in alternating circumferential directions to produce back-and-forth scan traces across the target. In an alternative embodiment, the drive causes the mirror to rotate completely around an axis of rotation (e.g., perpendicular to the plane of the drawing shown in FIG. 1). Scan rates of up to about 500 Hz can be achieved.

Alternatively, the scanning optics may comprise an omni-directional scan line pattern generator that generates intersecting scan line patterns, as described in Krichever et al. (U.S. Pat. No. 5,059,779, assigned to the present assignee), which is herein incorporated by reference.

Figure 2:
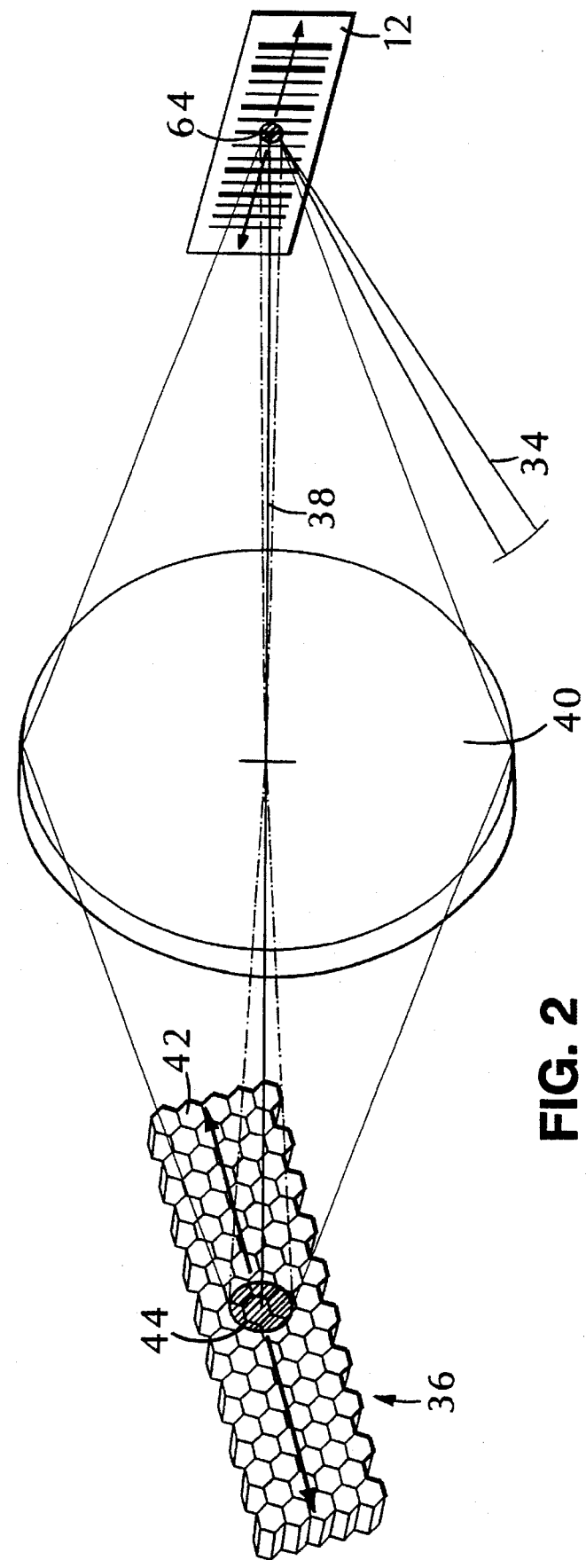
FIG. 2 is a schematic view of a quasi-retroreflective light collection scheme in which light reflecting from a bar code symbol is focused onto a portion of a two-dimensional array of photodetectors.

In a preferred embodiment, shown in FIG. 2, detector 36 includes a close-packed, two-dimensional array of individually accessible photodetectors 42 (e.g., silicon p-i-n photodiodes). The incoming light is imaged by lens 40 onto the surface of the photodetector array as a spot 44. The imaged spot covers at least about one photodetector, and preferably covers at least about two or three photodetectors simultaneously, so that there is little chance the incoming light will be undetected.

In a typical embodiment, the array of photodetectors spans an image area of about 4 mm by 12 mm, and includes about 500 individually accessible photodiodes, each having an active surface area of approximately 0.1 mm$^2$.

It should be appreciated that the density of the photodiodes will depend upon the specific dimensions of the scanning system. For example, for targets that are spaced relatively far from the scanner, it is desirable to have a relatively high density of photodiodes because the focal spot of the imaged incoming light tends to cover a smaller area on the detector array.

Figure 3A:
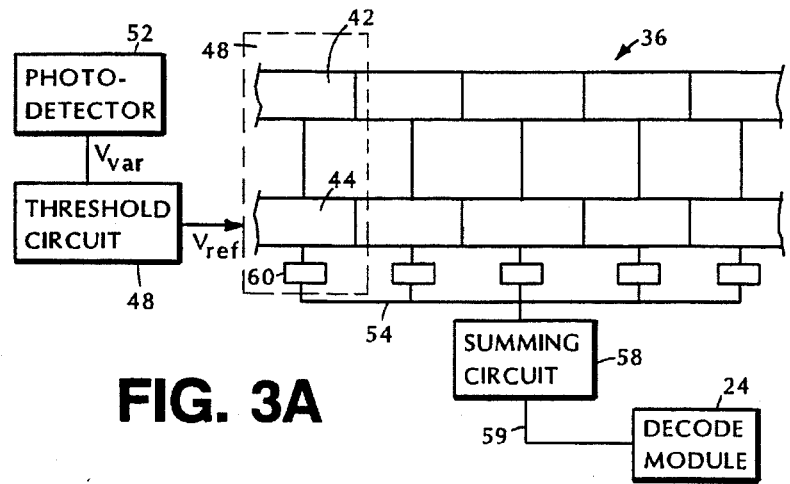
FIG. 3A is a schematic diagram of a photodetector array and associated circuitry.
Figure 3B:
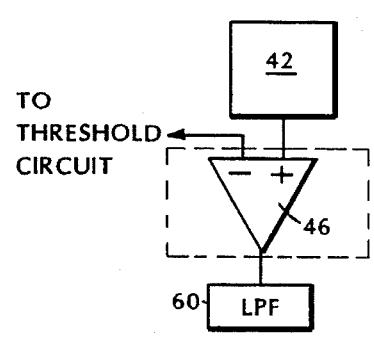
FIG. 3B is a schematic diagram of a photodetector and a preamplifier.
Figure 3C:
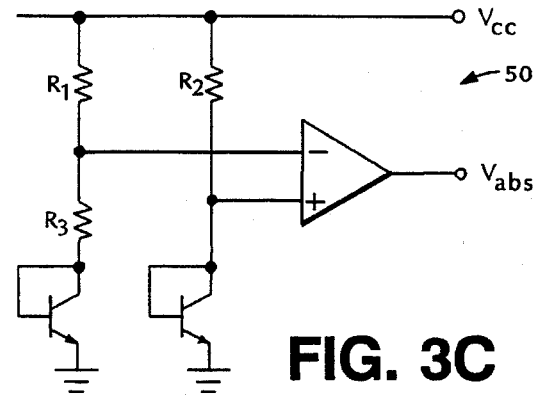
FIG. 3C is a schematic diagram of a band-gap reference circuit for generating an absolute value reference signal.

The photodetector array converts incident light into electrical signals representative of incoming signal beam 38. FIGS. 3A–3C show that portion of circuitry 39 that processes the outputs of the photodetectors to form the output signal supplied to the decode module. A preamplifier circuit 44, which includes e.g., an operational amplifier 46, or some other type of comparator circuitry, is preferably associated with each photodetector 42. Preamplifier circuit 44 permits a threshold value to be established for each photodetector, below which a converted signal is not interpreted as a received input signal, and thus, the output of the associated preamplifier remains at a null reference value. An absolute threshold value $V_{abs}$ can be established by a threshold circuit 48, which includes a conventional band-gap reference circuit 50, as shown in FIG. 3C. Alternatively, a variable threshold value $V_{var}$ can be established that depends on the amount of ambient light entering the scanner. In this scheme, a photodetector 52 (e.g., a semiconductor p-i-n photodiode), positioned near window 20, receives stray ambient light that enters the scanner and provides a variable reference value $V_{var}$ to the threshold circuitry 48 which can be used to establish $V_{ref}$. This scheme allows for the rejection of DC level shifts due to background illumination and other factors.

The output of each preamplifier circuit 44 couples to a bus 54 that feeds onto a summing circuit 58, which provides an output signal 59 representative of the algebraic sum of the output values of all of the photodetectors. The output signal is delivered to the input of decode module 24, that decodes the output signal into data representative of the information stored on the scanned bar code symbol.

A low-pass filter 60 is preferably employed at the output of each preamplifier 44, to smooth out high frequency noise signals at each preamplifier output. Decode module 24 preferably includes a digitizer circuit for shaping the signal output of the summing circuit 54, e.g., as described in Martino U.S. Pat. No. 5,272,323, which is herein incorporated by reference.

Figure 4:
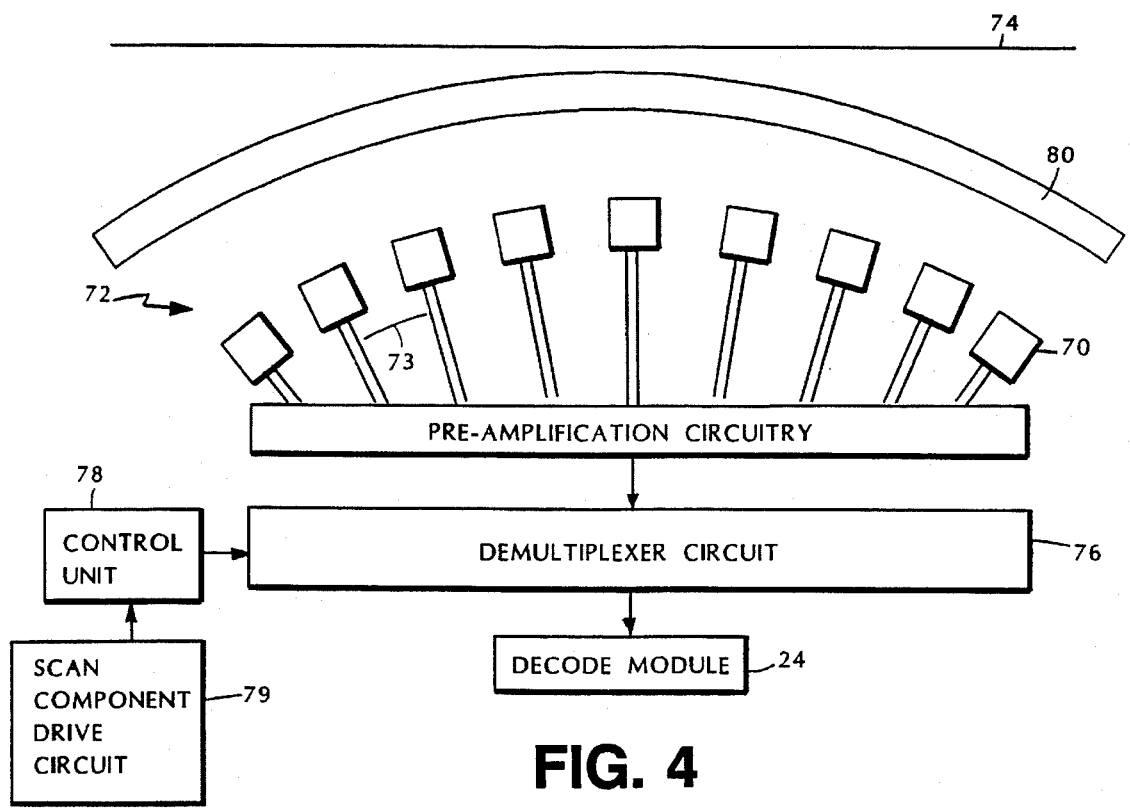
FIG. 4 is a schematic diagram of an alternative quasi-retroreflective light collection scheme.

As shown in FIG. 4, an alternative light collection scheme, an array of individually accessible photodetectors 70 (e.g., semiconductor p-i-n photodiodes) is arranged in an arc-shaped configuration 72, with at least two of the photodetectors 70 oriented at an acute angle 73 with respect to each other. In other words, at least two of the photodetectors are constructed and arranged to receive the incoming light, which is scanned across a scan plane 74, at a preferential angle of incidence that is different.

This arrangement reduces the field of view of each photodetector by orienting the photodetectors to preferentially receive the incoming signal beam along intersecting beam paths. The narrowed field of view of the constituent photodetectors increases the signal-to-noise ratio of the scanner.

The number of photodetectors employed will depend upon the total scan angle of the incoming light beam, and the desired field of view of each of the photodetectors. Preferably, the fields of view the constituent photodetectors overlap, so that there is little chance that the incoming light beam will be undetected.

For example, assuming the incoming light beam has a scan angle of about forty degrees, and each photodetector is constructed to have a field of view of about ten degrees, preferably at least about five photodetectors will be employed. If each photodetector is constructed to have a field of view of about four degrees, preferably at least about eleven photodetectors will be employed.

Each photodetector 70 is selectively gated to decode module 24 by a demultiplexer circuit 76. A controller 78 choreographs the gating provided by the demultiplexer synchronously with the motion of the scanning component which traces the outgoing light beam across the surface of the symbol, which is controlled by a scan component drive circuit 79.

To enhance the performance of this light collection scheme, an aperture 80, e.g., a Fresnel lens can be installed in front of the photodiodes to further reduce the field of view of the photodetector array, and thereby increase the signal-to-noise ratio of the scanner.

Alternatively, aperture 80 can comprise, e.g., a slit, or a plurality of slits, mounted inside the scanner between the collector optics and each of the constituent photodetectors, to reduce the field of view of the photodetectors.

Other embodiments are within the scope of the following claims. For example, the invention may be used with a wide variety of bar code readers, e.g., wand-type readers and fixed mount readers in which no trigger is used to initiate reading. A fixed mount scanner may scan continuously or be controlled by an external signal to initiate reading.

What is claimed is:

1. An optical scanner for scanning an outgoing light beam across an information symbol comprising regions of different light reflectivity, and for collecting an incoming light beam (the outgoing light beam as modified by the regions of different light reflectivity), the scanner comprising:

a source of the outgoing light beam;

scanning optics with at least one moving optical element for tracing the outgoing light beam across the symbol;

stationary light collection optics for collecting the incoming light beam and for directing the incoming light beam to an optical detector;

the optical detector comprising an array of individual light detection elements, each capable of providing an output representative of light impinging thereon, the array of detection elements being sized and configured so that the incoming light beam sweeps across the array of detection elements; and detection circuitry for determining on which of the detection elements the incoming light beam is impinging at a given time and for producing an output signal primarily from the outputs of those detection elements.

2. A method of optically scanning an outgoing light beam across an information symbol comprising regions of different light reflectivity, and collecting an incoming light beam (the outgoing light beam as modified by the regions of different light reflectivity), the method comprising the steps of:

generating the outgoing light beam;

scanning the outgoing light beam across the symbol using at least one moving optical element;

collecting the incoming light beam using stationary light collection optics and directing the incoming light beam to an optical detector, the optical detector comprising an array of individual light detection elements, each capable of providing an output representative of light impinging thereon, the array of detection elements being sized and configured so that the incoming light beam sweeps across the array of detection elements; and determining on which of the detection elements the incoming light beam is impinging at a given time and producing an output signal primarily from the outputs of those detection elements.

3. Apparatus for optically scanning an outgoing light beam across an information symbol comprising regions of different light reflectivity, and collecting an incoming light beam (the outgoing light beam as modified by the regions of different light reflectivity), comprising:

light source means for generating the outgoing light beam;

scanning means for scanning the outgoing light beam across the symbol using at least one moving optical element;

collecting means for collecting the incoming light beam using stationary light collection optics and directing the incoming light beam to an optical detector;

the optical detector comprising an array of individual light detection elements, each capable of providing an output representative of light impinging thereon, the array of detection elements being sized and configured so that the incoming light beam sweeps across the array of detection elements; and detection means for determining on which of the detection elements the incoming light beam is impinging at a given time and producing an output signal primarily from the outputs of those detection elements.

4. The subject matter of claim 1, 2, or 3 wherein determining on which detection elements the incoming light beam is impinging is performed by synchronizing sampling of detection elements to scanning movement of said outgoing light beam.

5. The subject matter of claim 1, 2, or 3 wherein determining on which detection elements the incoming light beam is impinging is performed based on the output level of the detection elements.

6. The subject matter of claim 5 wherein primarily only detection elements with outputs exceeding a threshold are used to produce output signal.

7. The subject matter of claim 6 wherein the outputs exceeding a threshold are summed to provide the output signal.

8. The subject matter of claim 4 wherein the detection elements comprise individually accessible photodetectors.

9. The subject matter of claim 5 wherein the detection elements comprise individually accessible photodetectors.

10. The subject matter of claim 6 wherein the detection elements comprise individually accessible photodetectors.

11. The optical scanner of claim 8 wherein first and second of the photodetectors are oriented to preferentially receive the incoming light beam along first and second intersecting incoming beam paths.

12. The optical scanner of claim 10 wherein first and second of the photodetectors are oriented to preferentially receive the incoming light beam along first and second intersecting incoming beam paths.

13. The subject matter of claim 1, 2, or 3 wherein a filter is used to selectively transmit to the optical detector primarily only light having a wavelength range corresponding to the wavelength range of the incoming light beam.

14. The subject matter of claim 1, 2, or 3 wherein field-of-view limiting optics are provided to restrict the field of view of individual detection elements.

15. The subject matter of claim 14 wherein the field-of-view limiting optics comprises Fresnel lenses.

16. The subject matter of claim 14 wherein the field-of-view limiting optics comprises orientation of the detection elements to preferentially receive incoming light along incoming light paths that are at acute angles with respect to the incoming light paths of other detection elements.

* * * * *

UNITED STATES PATENT AND TRADEMARK OFFICE
CERTIFICATE OF CORRECTION

PATENT NO. : 5,530,233

DATED : June 25, 1996

INVENTOR(S) : Mark Krichever, Simon Bard, and Peter Fazekas

It is certified that error appears in the above-identified patent and that said Letters Patent is hereby corrected as shown below:

Cover page, under [73] Assignee: "Bonemia" should be --Bohemia--.

Signed and Sealed this

Fifth Day of November, 1996

*Attest:*

BRUCE LEHMAN

*Attesting Officer*    *Commissioner of Patents and Trademarks*